US009050873B2

(12) United States Patent
Dilworth et al.

(10) Patent No.: US 9,050,873 B2
(45) Date of Patent: Jun. 9, 2015

(54) SUSPENSION SYSTEM HAVING A LEAF SPRING

(71) Applicant: Hendrickson USA, L.L.C., Itasca, IL (US)

(72) Inventors: Damon E. Dilworth, Channahon, IL (US); Andrew X. Rarey, North Aurora, IL (US); Sammy C. Lumetta, Naperville, IL (US); Ashley T. Dudding, Plainfield, IL (US)

(73) Assignee: HENDRICKSON USA, L.L.C., Itasca, IL (US)

( * ) Notice: Subject to any disclaimer, the term of this patent is extended or adjusted under 35 U.S.C. 154(b) by 303 days.

(21) Appl. No.: 13/796,335

(22) Filed: Mar. 12, 2013

(65) Prior Publication Data

US 2014/0035248 A1 Feb. 6, 2014

Related U.S. Application Data

(60) Provisional application No. 61/680,156, filed on Aug. 6, 2012.

(51) Int. Cl.
*B60G 21/05* (2006.01)
*B60G 11/04* (2006.01)
*B60G 9/00* (2006.01)
*B60G 11/38* (2006.01)

(52) U.S. Cl.
CPC .............. *B60G 11/04* (2013.01); *B60G 9/003* (2013.01); *B60G 11/38* (2013.01); *B60G 2202/112* (2013.01); *B60G 2202/143* (2013.01); *B60G 2204/4306* (2013.01); *B60G 2204/4502* (2013.01)

(58) Field of Classification Search
USPC ........ 280/124.106, 124.163, 124.17, 124.174
See application file for complete search history.

(56) References Cited

U.S. PATENT DOCUMENTS

| 2,659,595 | A |   | 11/1953 | Coda |
|---|---|---|---|---|
| 2,701,713 | A |   | 2/1955 | Tea |
| 3,079,139 | A | * | 2/1963 | Rowland et al. ................ 267/47 |
| 3,580,347 | A | * | 5/1971 | McGee ........................... 180/22 |
| 3,799,571 | A |   | 3/1974 | Sudberry |
| 3,945,625 | A | * | 3/1976 | Duchemin ...................... 267/47 |
| 4,676,488 | A | * | 6/1987 | Castaing ......................... 267/47 |
| 4,802,659 | A | * | 2/1989 | Hope ............................ 267/149 |

(Continued)

FOREIGN PATENT DOCUMENTS

| DE | 35 28 618 A1 | 2/1987 |
|---|---|---|
| DE | 10 2005 032610 A1 | 1/2007 |
| FR | 2 008 264 A1 | 1/1970 |

OTHER PUBLICATIONS

PCT/US2013/052192 International Search Report and Written Opinion, dated Apr. 10, 2013 (5 pages).

(Continued)

*Primary Examiner* — Toan To
(74) *Attorney, Agent, or Firm* — Cook Alex Ltd.

(57) ABSTRACT

Suspension systems, leaf springs and methods of providing a leaf spring in a suspension system are disclosed. The suspension systems, leaf springs and methods of providing a leaf spring in a suspension system allow use of a lighter weight leaf spring while providing customized roll stiffness and vertical spring rate that are complemented by a bumper that engages the leaf spring assembly when compressed to at least a preselected position.

16 Claims, 15 Drawing Sheets

(56) References Cited

U.S. PATENT DOCUMENTS

| | | | |
|---|---|---|---|
| 5,129,671 A * | 7/1992 | Walton | 280/5.51 |
| 5,209,518 A * | 5/1993 | Heckenliable et al. | 280/680 |
| 5,938,221 A * | 8/1999 | Wilson | 280/124.163 |
| 6,406,007 B1 * | 6/2002 | Wilson | 267/36.1 |
| 6,991,223 B2 * | 1/2006 | Platner et al. | 267/47 |
| 7,210,673 B2 * | 5/2007 | Platner et al. | 267/52 |
| 7,753,400 B2 * | 7/2010 | Dunlap et al. | 280/682 |
| 2003/0090078 A1 * | 5/2003 | Proia | 280/124.17 |

OTHER PUBLICATIONS

PCT/US2013/052192 International Search Report, dated Apr. 10, 2013 (4 pages).

* cited by examiner

SUSPENSION SYSTEM HAVING A LEAF SPRING

CROSS-REFERENCE TO RELATED APPLICATION

This application claims the benefit of U.S. Provisional Patent Application Ser. No. 61/680,156, filed Aug. 6, 2012, the disclosure of which is hereby incorporated by reference in its entirety.

BACKGROUND OF THE INVENTION

1. Field of the Invention

The present invention generally relates to a leaf spring and a suspension system employing a leaf spring for use in a vehicle. This disclosure presents several example embodiments that may be utilized for particular purposes.

2. Discussion of the Prior Art

Wheeled vehicles commonly have suspension systems that utilize springs to suspend a body assembly above the axles to which wheels are rotatably connected. In this context, the body assembly generally is referred to as the sprung portion of the vehicle and the wheels and respective axles, whether dealing with independent suspensions or solid axle suspensions, generally are referred to as the unsprung portions of the vehicle. For ease of reference, suspension systems may be said to be part of a chassis of a vehicle with an understanding that the chassis may include a frame assembly or may be integrally constructed with a body assembly, such as in a so-called unibody construction.

Suspension systems typically include active components designed to isolate from the sprung portion the disturbances encountered by the unsprung portions, such as occur during acceleration and deceleration, or during jounce and rebound of the axle when traversing bumps in a road surface and the like, and to withstand lateral and roll oriented forces, such as are encountered when cornering. Such systems also typically are designed with an intended relative positioning of the unsprung portions to the sprung portion at rest and during normal operation of the vehicle when being driven. This relative positioning results in what is commonly referred to as the ride height of a vehicle. Thus, the normal ride height of a vehicle relates to the height of the vehicle when it is ready to be driven with the suspension system in a normal condition to isolate disturbances.

With the advent of new laws regarding braking capabilities of vehicles, such as heavy duty trucks, forces and stresses experienced in suspension systems during hard braking are creating more extreme conditions for suspension systems. To meet the new braking requirements, suspension systems using traditional leaf spring configurations that tend to have equal length in the front and rear limbs would likely have a relatively long, thick and inactive axle seat portion, and sufficient spring thickness and vertical spring rate to be capable of dealing with the resulting axle wind up, and with sufficient roll stiffness. However, such a configuration with a massive axle seat portion, substantial thickness and a relatively high spring rate within the limbs of the leaf spring results in heavy springs that also produce relatively harsh ride quality.

The present disclosure addresses shortcomings found in prior art suspension systems.

SUMMARY OF THE INVENTION

The present disclosure generally provides suspension systems, leaf springs and methods of providing a leaf spring in a suspension system that allows use of a lighter weight leaf spring while providing customized roll stiffness and vertical spring rate that are complemented by a bumper that engages the leaf spring assembly when compressed to at least a preselected position, such as during braking or when in a roll condition.

In a first aspect, disclosed herein is a suspension system for a vehicle axle that includes a leaf spring configured to be coupled at a front end and a rear end to a frame member of the vehicle, and an axle coupling assembly configured to be coupled to the leaf spring and to an axle of the vehicle. Also included is a bumper coupled to the axle coupling assembly or to the frame member of the vehicle and disposed to have a center of the bumper forward and inboard of a center of the axle coupling assembly and to be engaged when the leaf spring is compressed to at least a preselected position. The leaf spring also includes tapered upper and lower surfaces in an axle seat portion, and a front limb having a vertical spring rate and a length that extends forward from the axle seat portion to the front end and a rear limb having a vertical spring rate and a length that extends rearward from the axle seat portion to the rear end.

In a second aspect, disclosed herein is a leaf spring for use in a vehicle suspension system. The leaf spring includes an axle seat portion further comprising tapered upper and lower surfaces, and a locator. The leaf spring also includes a front limb having a vertical spring rate and a length that extends forward from the axle seat portion to a front end and a rear limb having a vertical spring rate and a length that extends rearward from the axle seat portion to a rear end.

In a third aspect, disclosed herein is a method of controlling roll stiffness in a suspension system for a vehicle that includes providing a leaf spring having an axle seat portion having tapered upper and lower surfaces, a front limb having a vertical spring rate and a length that extends forward from the axle seat portion to a front end and a rear limb having a vertical spring rate and a length that extends rearward from the axle seat portion to a rear end. The method also includes providing couplings that connect the front and rear ends of the leaf spring to a vehicle frame member and providing an axle coupling assembly that couples a vehicle axle to the axle seat portion of the leaf spring. The method further includes providing a bumper disposed between the leaf spring and the vehicle frame member, and wherein a center of the bumper is located forward and inward of a center of the axle coupling assembly, such that when the suspension is in a roll condition and the bumper is engaged and compressed, roll stiffness of the leaf spring is increased.

The present disclosure includes examples of suspension systems, leaf springs and methods of controlling roll stiffness that include use of a leaf spring having relatively low mass and a relatively low vertical spring rate for improved ride comfort, while also including a bumper that increases stiffness during roll and contributes to improved management of rear limb windup during braking. The leaf spring may be constructed with a combination of front to rear limb length ratio and spring rate ratio that provide the leaf spring with almost constant caster, despite having asymmetrical limb lengths. The leaf spring alternatively may be constructed to have an equal limb length ratio. Tapering of the upper and lower surfaces of the leaf spring in the axle seat portion acts as a longitudinal retention for the leaf spring within the axle coupling assembly. Having a maximum thickness in the axle seat portion contributes to lower assembly stress and may reduce chances of hydrogen assisted cracking, while the bumper assists in handling jounce, rear limb windup, and roll stiffness.

The leaf spring and axle coupling assembly do not include a center hole and bolt therethrough, helping to reduce potential stresses and the risk of leaf spring fracture. Instead, a less invasive locator may be used to help keep the leaf spring properly located within the axle coupling assembly. The lack of a hole through the axle seat portion of the leaf spring also allows more of the leaf spring to be active.

The upper and lower surface tapers in the forward region of the axle seat portion help to reduce mass, the overall vertical rate of the spring and the stress on the front parabola, in the examples provided, by removing low stressed material, where the overall thickness required at the center of the axle seat portion may be defined by the rear limb parabola in the examples, instead of the front. The rearward region of the axle seat portion also is tapered, reducing mass, adding extra longitudinal retention of the leaf spring and helping to balance the forces within an installed axle coupling assembly. When used with an axle coupling assembly having a closer clamping fastener pattern, more of what traditionally would have been the inactive axle seat portion of the leaf spring can be active. This permits increased leaf spring effectiveness, while allowing further reductions in the material and weight of the leaf spring and of the axle coupling assembly.

Inclusion of the bumper increases the roll stiffness in a dynamic maneuver. Location of the bumper forward of the center of the axle coupling assembly assists in balancing the stress between the front and rear limbs of the leaf spring during jounce and vehicle braking. Location of the bumper forward of and offset from the center of the axle coupling assembly also allows the use of the rear limb to add roll rate by causing more twist in the rear limb, and increased vertical rate via rear limb windup. This is made possible with a single leaf spring, or monoleaf, having a relatively low stress rear limb.

Prior art suspension systems that utilize a monoleaf configuration carry extra weight in steel where it is not needed to manage the stresses and tend to rely completely on the leaf spring to build roll stiffness into the suspension system at the cost of ride quality. This problem has been exacerbated by the mandates for decreased stopping distances which, in turn, further increase the stresses in the leaf spring and suspension system. Thus, the present disclosure presents examples of suspension systems, leaf springs and methods that overcome disadvantages of the prior art and may be used to reduce mass and to help control jounce, rear limb windup and roll, while controlling the limb spring rates and roll stiffness in a suspension system. This, in turn, provides lower unsprung mass, less vertical spring stiffness, and therefore, more comfort under normal driving conditions.

It is to be understood that both the foregoing general description and the following detailed description are exemplary, provided for purposes of explanation only, and are not restrictive of the subject matter claimed. Further features and objects of the present disclosure will become more fully apparent in the following description of example embodiments and from the appended claims.

BRIEF DESCRIPTION OF THE DRAWINGS

In describing the preferred examples, reference is made to the accompanying drawing figures wherein like parts have like reference numerals, and wherein.

Figure 1:
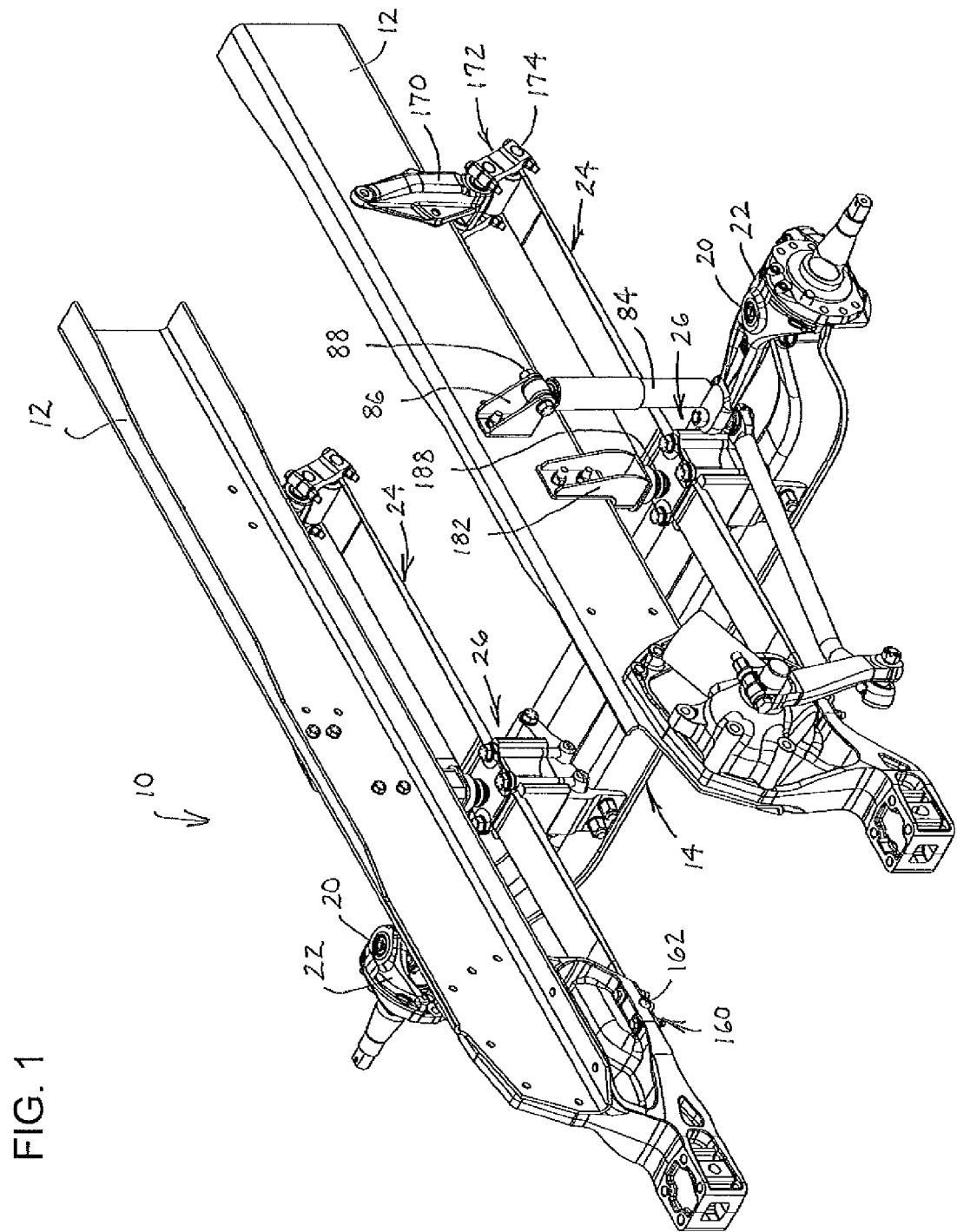
FIG. 1 is a front upper perspective view of a front suspension system of a wheeled vehicle including a first example of the inventive subject matter, which includes a bumper mounted on a vehicle frame member, above a leaf spring and axle coupling assembly.
Figure 2:
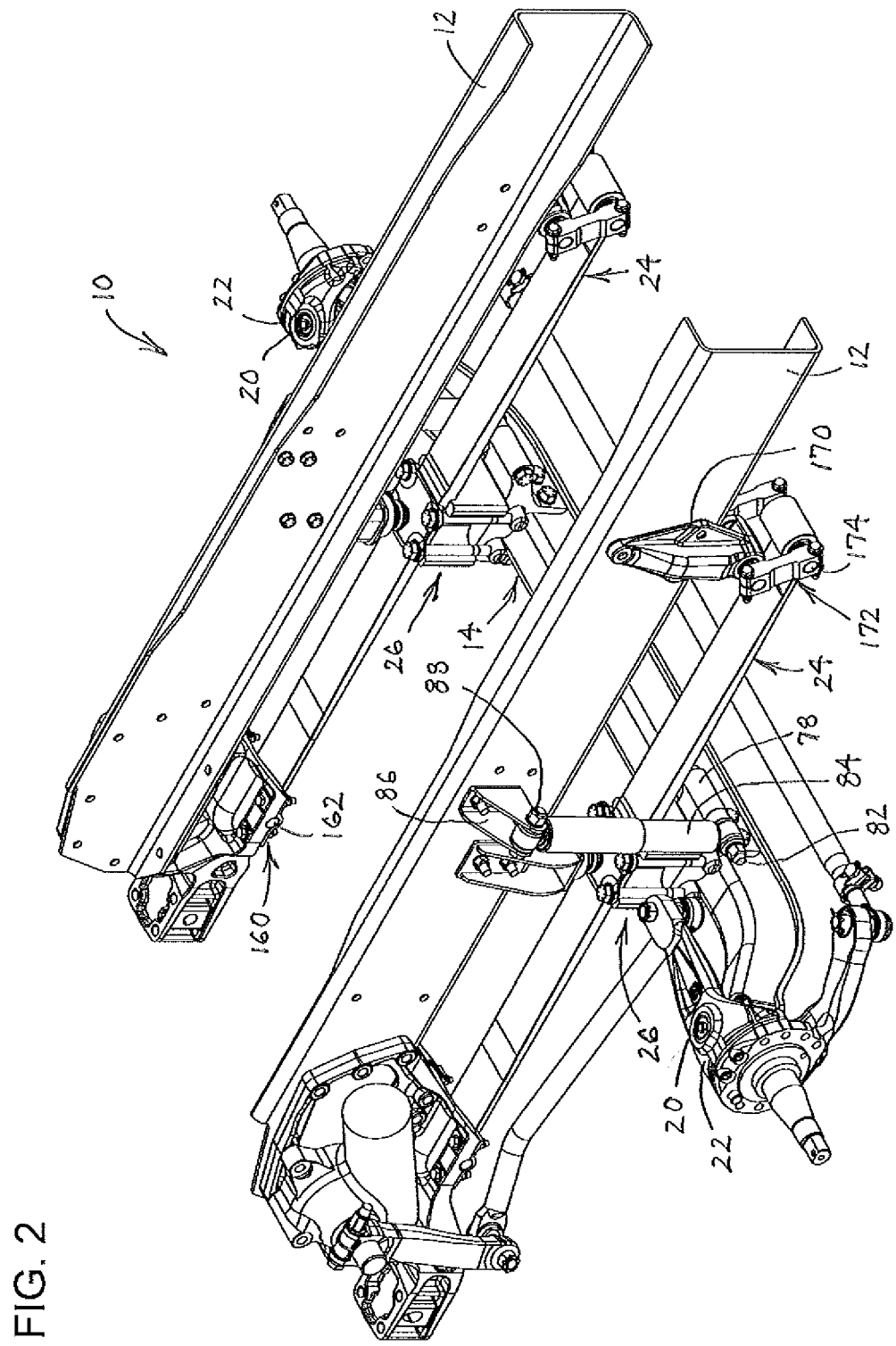
FIG. 2 is a rear upper perspective view of the front suspension system shown in FIG. 1.

It should be understood that the drawings are not to scale. While some mechanical details of suspension systems and leaf springs for a wheeled vehicle, including some details of fastening means, connection to well known vehicle components, and other plan and section views of the particular components, have been omitted, such details are considered within the comprehension of those skilled in the art in light of the present disclosure. It also should be understood that the present disclosure is not limited to the examples illustrated.

DETAILED DESCRIPTION

This disclosure presents examples of suspension systems, leaf springs for use in suspension systems and methods of controlling jounce and roll stiffness in vehicles, which may be embodied in several forms. For instance, in a first example, a vehicle suspension system is configured with the leaf spring of the present disclosure being coupled to a vehicle axle using a special axle coupling assembly that provides improved fastener engagement, and a bumper that is coupled to a frame member of the vehicle. It will be appreciated that, as shown in a further example, the suspension system could instead have the bumper coupled to the axle coupling assembly. As shown in yet a further example, it will be appreciated that the leaf spring of the present disclosure could be used with different axle coupling assemblies, and the leaf spring and suspension system may include variations as desired to suit particular installations and vehicle characteristics.

Turning to FIGS. 1-10, a first example suspension system 10 is illustrated for coupling longitudinally extending frame members 12 of a chassis of a vehicle to a laterally extending axle 14 that is disposed below the frame members 12, such as for use in a heavy duty truck or other wheeled vehicle. As with the other drawings in this disclosure, it will be appreciated that the figures show a front suspension system 10 for a steering axle, but that the suspension system could be configured for use with a non-steering rear axle. Also, some of the drawing figures, such as FIGS. 3 and 5-10 show components of the right side of the first example suspension system 10, but it will be appreciated that similar components, configured for the left side of the suspension system 10 would be provided to form a full suspension system.

Figure 3:
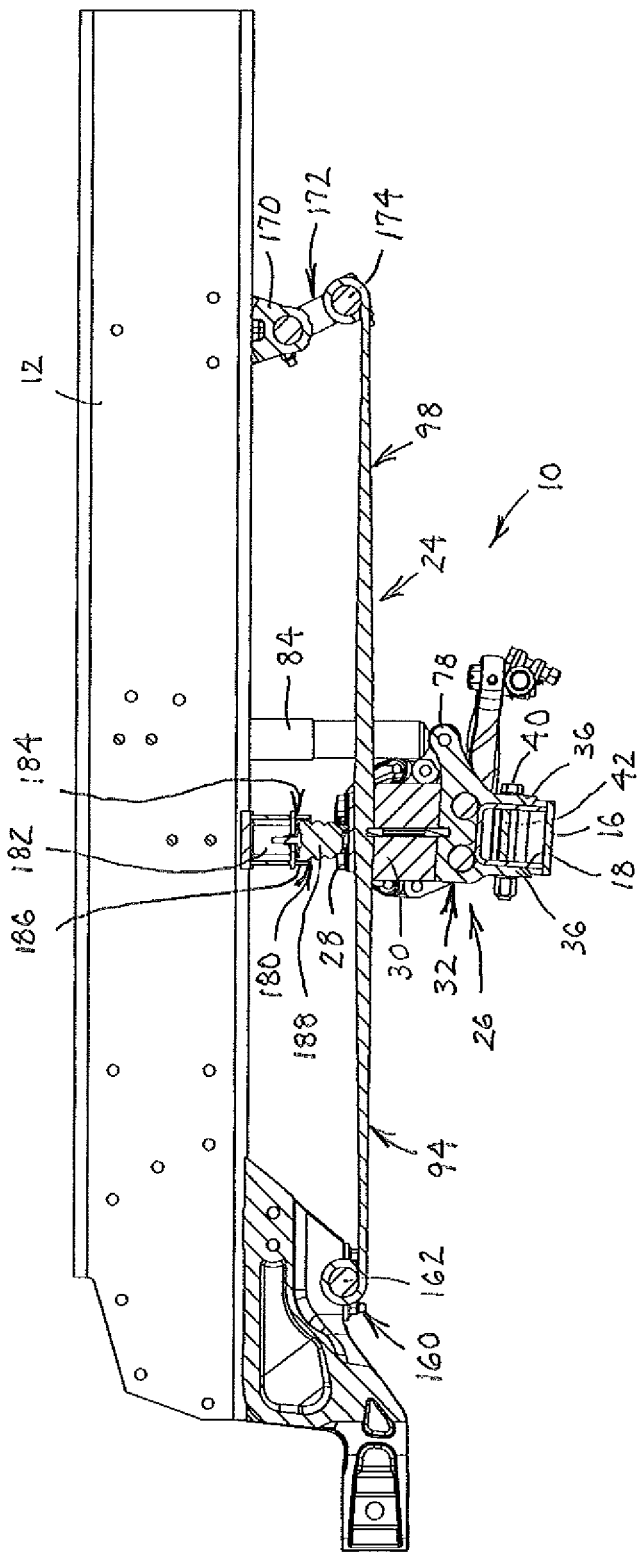
FIG. 3 is a cross-sectional side view through the right side assembly of the front suspension system shown in FIG. 1.
Figure 4:
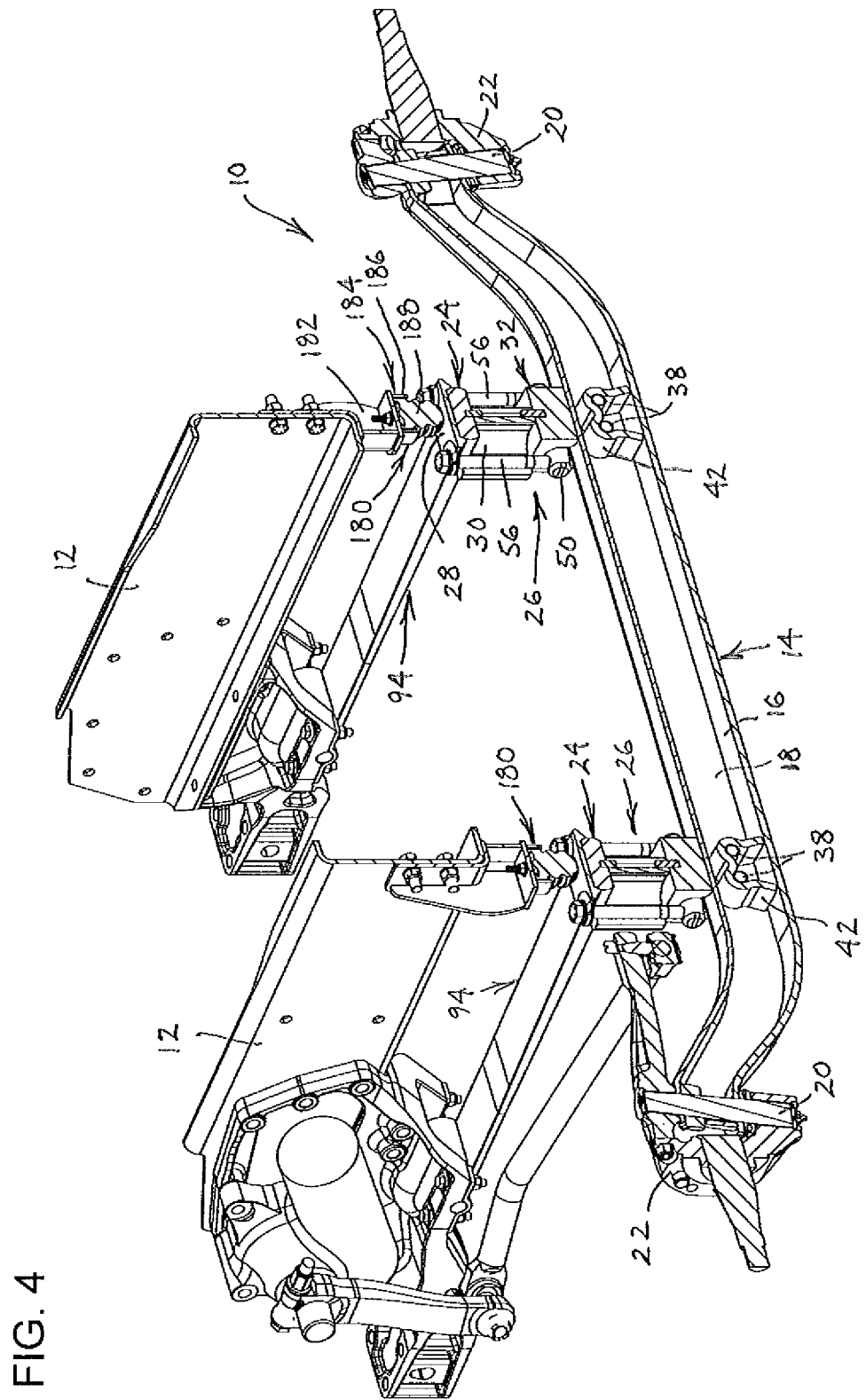
FIG. 4 is a cross-sectional rear view through the center of the axle coupling assembly of the front suspension system shown in FIG. 1.

In the first example suspension system 10, the axle 14 is shown in FIG. 3 as a fabricated axle that includes a laterally extending box section to provide high roll stability. The axle 14 includes a bottom plate 16 welded to an inverted U-shaped member 18, which for convenience are shown together in FIGS. 5-7 as an integral piece. A king pin 20 is operatively connected to each end of the fabricated axle 14, to which a steering knuckle 22 is pivotally connected. The axle 14 may be constructed of steel, or other suitable materials, and may be constructed in the manner described or by alternative manufacturing techniques to result in a fabricated or hollow axle member. It will be appreciated that, alternatively, the suspension system 10 may use an axle of more common solid axle construction. The axle 14 may be coupled to a leaf spring 24, such as of steel construction, by an axle coupling assembly 26.

Figure 5:
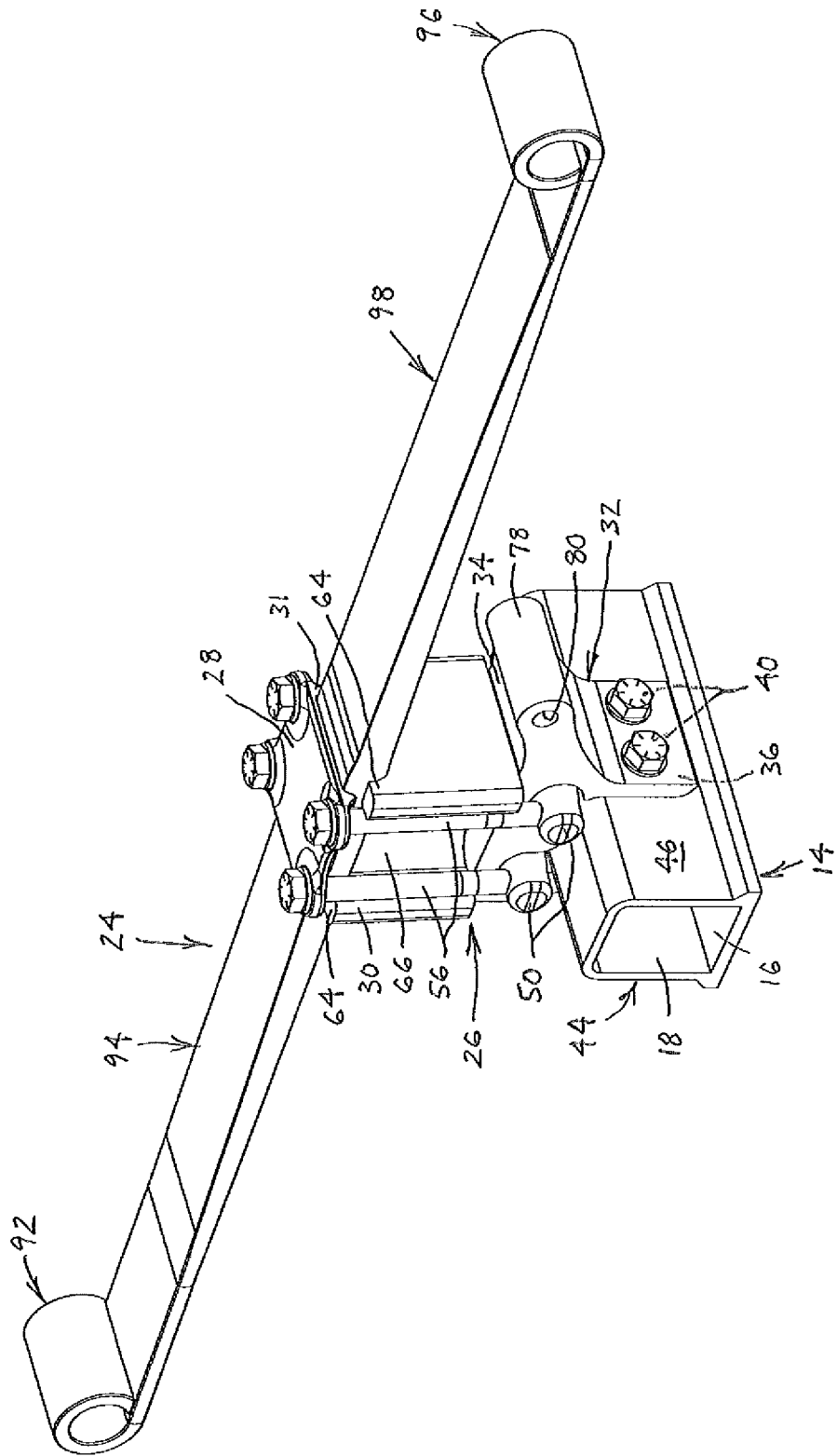
FIG. 5 is an upper perspective view of a leaf spring and axle coupling assembly of the suspension system shown in FIG. 1.
Figure 6:
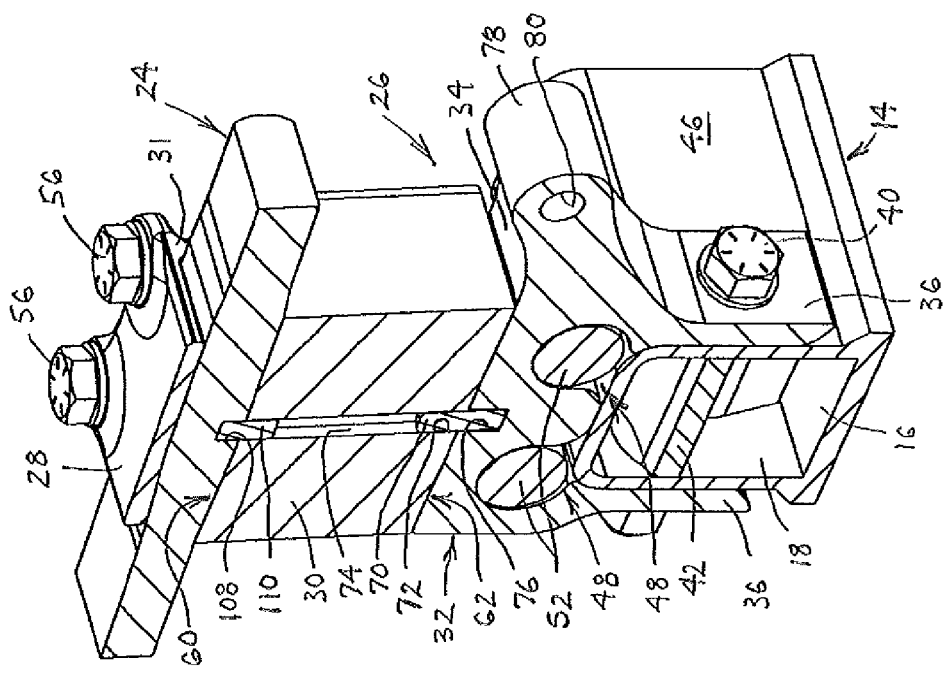
FIG. 6 is a closer upper perspective view of a portion of the leaf spring with the axle coupling assembly shown in FIG. 5.
Figure 7:
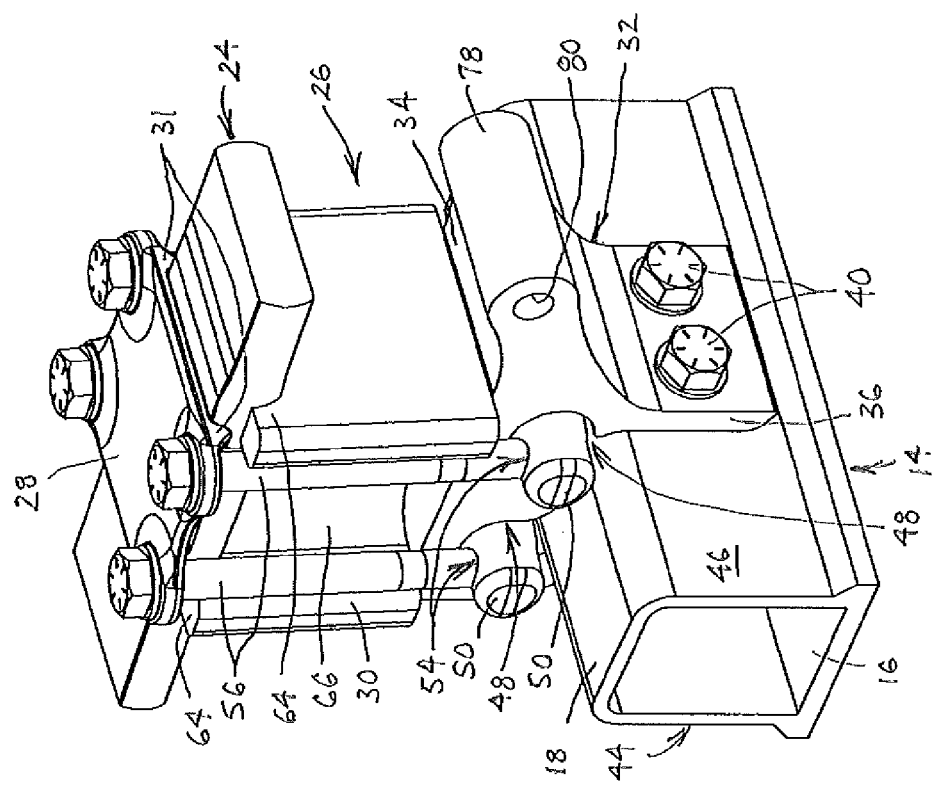
FIG. 7 is a cross-sectional perspective view through the center of the axle coupling assembly and the portion of the leaf spring shown in FIG. 6.

From the top downward, as may be seen in FIGS. 5-7, the axle coupling assembly 26 includes a first mounting pad 28, also known as a top pad, first guide plate or clamp plate, which engages the upper surface of the leaf spring 24. The lower surface of the leaf spring 24 engages an upper surface of a spacer 30, and a lower surface of the spacer 30 engages an upper surface of an axle seat bracket 32, also known as a second mounting pad, bottom pad, second guide plate or clamp plate. The first mounting pad 28 is preferably forged or cast iron or steel, while the spacer 30 and axle seat bracket 32 are preferably constructed of extruded aluminum, such as 6061-T6, although other suitable grades of aluminum may be used, and indeed other suitable materials, configurations and methods of construction may be used, including for example cast iron or steel parts.

The first mounting pad 28 of this example also includes locating extensions 31 that extend downward and have interior spring-engaging edges that may be angled and configured to engage the sides of the leaf spring 24. The axle seat bracket 32 is fitted over and engages the upper surface of the axle 14 and includes an upper surface 34 which engages the lower surface of the spacer 30, and downwardly extending flanges 36. The respective downwardly extending flanges 36 include aligned bores (not shown) that receive cylindrical sleeves 38, constructed of aluminum, steel or the like, through which extend fasteners 40, such as hardened bolts that engage nuts, so as to connect the axle seat bracket 32 to the axle 14. For enhanced support to the axle 14 when the fasteners 40 are tightened, the sleeves 38 that are located within the bores provide assistance in locating a baffle or support member 42 within the axle 14. The sleeves 38 are long enough to fit within the bores in the axle 14, while being slightly shorter than the distance between front and rear surfaces 44, 46 of the inverted U-shaped member 18 of axle 14. This permits a connection with slight deformation in the U-shaped member 18 of the axle 14 to provide solid clamping of the axle seat bracket 32 to the axle 14, backed by support member 42 within the axle 14. It will be appreciated that the sleeves 38 and/or the support member 42 may not be necessary, depending on the construction of the axle 14 and axle seat bracket 32.

The axle seat bracket 32 includes passages 48 that are generally cylindrically shaped and parallel to the axle 14. The passages 48 receive respective bar pins 50, each of which has a cylindrical center portion 52 that is configured to pivot within a passage 48. Each bar pin 50 is preferably constructed of forged 4140 heat treated steel for desired strength, but may be constructed of other suitable materials and by other suitable methods. Each bar pin 50 has a bore 54 at each end, with each bore 54 receiving a fastener 56. In this example, the bores 54 are threaded, although for convenience, the threads are not shown. The fasteners 56 of this example are hardened bolts that extend through respective bores (not shown) in the first mounting pad 28, and the threaded ends engage at least some of the respective threads within the bores 54 in the bar pins 50. When tightened, the fasteners 56 clamp together the first mounting pad 28, the leaf spring 24, the spacer 30 and the axle seat bracket 32, ultimately coupling the axle 14 to the leaf spring 24. As may be seen in FIG. 6, the first mounting pad 28 may be configured to be slightly wider than the leaf spring 12, causing the fasteners 56 to self-center and resulting in at least a portion of the clamping forces being applied by the interior spring-engaging angled sides of the locating extensions 31 to laterally squeeze the leaf spring 12. Depending on the rigidity of the first mounting pad 28 and the amount of clamping force applied, this can result in a slight deformation of the first mounting pad 28, thereby increasing the clamping force between the components within the axle coupling assembly 26. The locating extensions 31 also may act as a stop, limiting the amount of deformation and resisting rotational forces imposed upon the first mounting pad 28 during installation of the axle coupling assembly 26.

The fasteners 56 preferably extend into and through the bores 54 in the respective bar pins 50. Alternative ways of fastening the components to each other may be used, such as if the bores 54 do not include threads but are sized to allow sufficiently longer fasteners, such as threaded bolts, to pass therethrough and to receive nuts on the distal ends by which a clamp load may be applied.

It will be appreciated by those skilled in the art that vehicles often have a front or rear axle with a fixed caster angle, or a rear drive axle with a fixed a pinion angle. Accordingly, as shown in this first example, a caster angle may be included within the axle coupling assembly 26 by including it within the configuration of the spacer 30. Thus, the spacer 30 includes an upper surface 60 that engages the leaf spring 24 where the upper surface 60 is angled relative to a lower surface 62 of the spacer 30. A fixed caster angle could otherwise be provided by including an additional wedge component, or could be built into the axle seat bracket 32. However, a common axle seat bracket 32 for several assemblies may be used if the caster or pinion angle is provided in a spacer or wedge component that is particular to respective different assemblies. Also, the bar pins 50 will allow the axle coupling assembly 26 to automatically adjust to an assembly that includes a caster or pinion angle, as the bar pins 50 will rotate to an accommodative angle within the axle seat bracket 32 as the fasteners 56 are tightened, resulting in a final clamped axle coupling assembly 26 having the faces of respective fasteners 56 being parallel to the clamping surfaces provided on the first mounting pad 28. This effectively eliminates problems with nut face or bolt head angularity that could occur during clamp up of the axle coupling assembly. Notably, fasteners 56 having a similar length may used in an assembly having a component that includes a caster or pinion angle, which will result in the bolts on the thinner end of the axle coupling assembly 26 traveling further through their respective bar pins 50.

The spacer 30 of this example also includes locating extensions 64 that extend upward beyond the upper surface 60 and assist in positioning the leaf spring 24 relative to the axle 14. To reduce the weight of the spacer 30, while providing a further locating feature, the sides 66 of the spacer 30 also are sculpted to permit the fasteners 56 to be located adjacent the sides of the leaf spring 24, while still providing the locating extensions 64 that engage sides of the leaf spring 24. It also will be appreciated that, the spacer 30 may be extruded, as noted above, and then may be machined to introduce a caster or pinion angle and the extensions 64.

A further locating feature is provided by engagement of a fastener 70, shown for example in the form of a pin or stud, with a locator 72 in the spacer 30, shown for example in the form of a central passage 74. A corresponding locator 76 is configured, for example, as a receptacle in the upper surface 34 of the axle seat bracket 32. It will be appreciated that alternative locating structures could be utilized, and use of a fastener and locator could be in reversed relative to the particular components. The axle seat bracket 32 also may include mounting extensions or bores for connection to other components. For instance, to provide suspension system damping, the axle seat bracket 32 may include an extension 78 having a bore 80 therethrough to receive a fastener 82, such as bolt, for connection to the lower end of a shock absorber 84. Such a shock absorber 84 may be connected at its upper end to a mounting bracket 86 that receives a fastener 88, such as a bolt.

While the above axle coupling assembly 26 is illustrated, the scope of this disclosure is not to be limited to such an example assembly, as various other configurations and components may be utilized to couple an axle to the leaf spring.

Now more detail will be provided concerning the construction of the leaf spring 24, and its couplings to a frame member 12, the axle coupling assembly 26 and other components of the first example suspension system 10.

As may be seen in FIGS. 3, 5 and 8-10, the leaf spring 24 includes an axle seat portion 90, a front end 92 that is forward of the axle seat portion 90, and a front limb 94 that extends between the axle seat portion 90 and the front end 92. Also included in this example is a rear end 96 that is rearward of the axle seat portion 90, and a rear limb 98 that extends between the axle seat portion 90 and the rear end 96.

The axle seat portion 90 is not defined with exactness, but is a portion along the leaf spring 24 where the axle is coupled thereto. Somewhat similarly, the front end 92 and rear end 96 are not intended to refer to a distal most surface at the ends of the respective front limb 94 and rear limb 98, but rather should be considered those regions near to and including the distal ends of the leaf spring 24.

The leaf spring 24 generally has an upper surface 100 and a lower surface 102, and a thickness of the leaf spring can be determined at any selected position along its length, by measuring the distance between the upper surface 100 and lower surface 102 at the selected position. Similarly, the leaf spring has a right side surface 104 and a left side surface 106, as viewed from above and looking in a forward direction of the component. Accordingly, a width of the leaf spring can be determined at any selected position along the length of the leaf spring by measuring the distance between the right side surface 104 and the left side surface 106 at the selected position. It will be appreciated that throughout this disclosure, with respect to the descriptions of all of the examples and respective components provided, terms such as upper, lower, top, bottom, left, right, front and rear, all are relative terms used for convenience within the description and are not intended to be limiting because they depend on the context in which they are used.

The leaf spring 24 also includes a locator 108, shown for example in the form of a receptacle in the lower surface 102, which in this example is formed by hot staking or embedding a fastener 110, such as a pin or stud, into the lower surface 102 of the leaf spring 24. It will be appreciated that alternative locating structures could be utilized for these components as well, and that use of a fastener and locator could be in reversed relative to the particular components. When assembled with the axle coupling assembly 26, the fastener 110 is received within the central passage 74 within the spacer 30. The locator 108 that receives the fastener 110 and the respective passage 74 help to position and hold the leaf spring 24 longitudinally within the axle coupling assembly 26. It will be appreciated that alternative locating structures could be utilized for these components as well, and that use of a fastener and locator could be reversed relative to the particular components, and that, if possible, it is preferable not to use a bolt through a hole in the center of the leaf spring 24.

The leaf spring 24 includes linear tapers in thickness by which it decreases in thickness from within the axle seat portion 90 as one moves toward the respective front and rear ends 92, 96. The leaf spring 24 also includes tapers in width by which it increases in thickness from within the axle seat portion 90 to the respective front and rear ends 92, 96. Indeed, while within this first example, the upper and lower surfaces 100, 102 include the same tapers, dissimilar tapers may be used. The drawing figures include laterally extending lines on the upper and lower surfaces 100, 102, and vertically extending lines on the right and left side surfaces 104, 106. These respective lines are intended to indicate where dimensional changes occur, and thus are of assistance to one who is determining where tapers in thickness and width are occurring.

Figure 8:
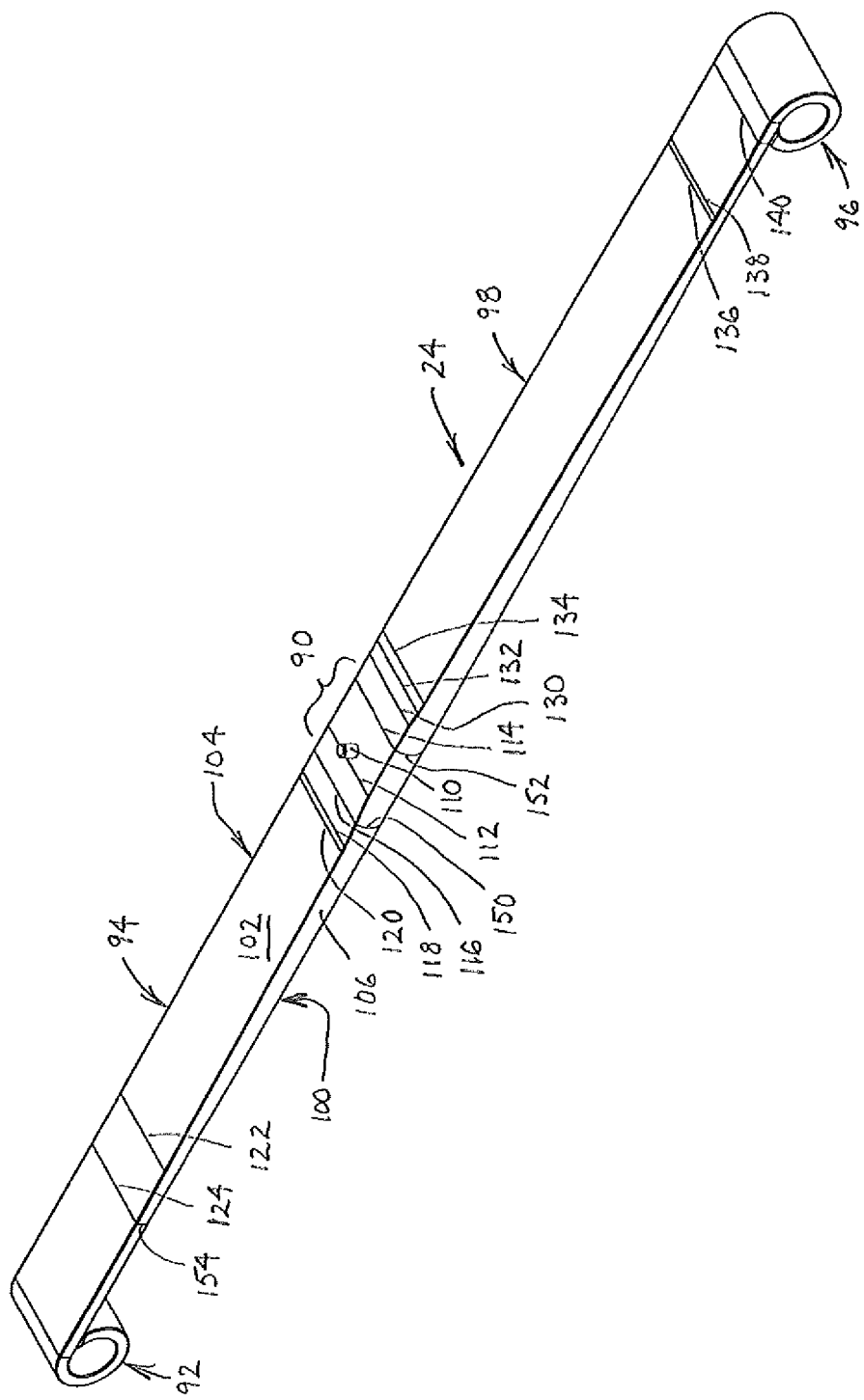
FIG. 8 is a lower rear perspective view of the leaf spring shown in FIG. 5.
Figure 9:
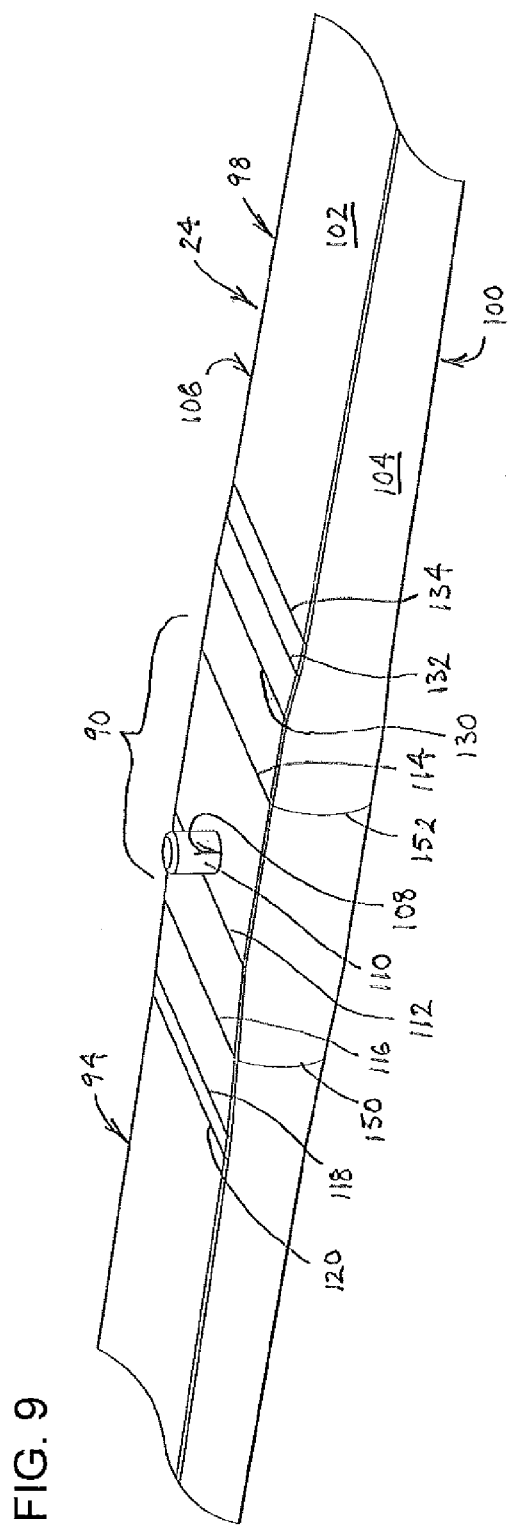
FIG. 9 is a closer lower perspective view of a portion of the leaf spring shown in FIG. 8.
Figure 10:
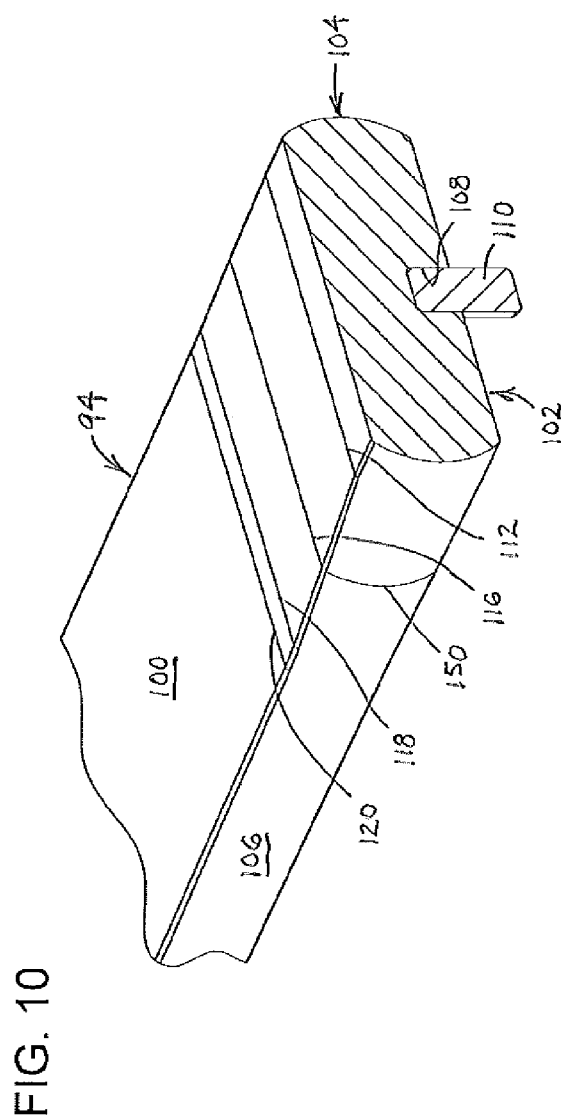
FIG. 10 is a cross-sectional perspective view through the center of the leaf spring shown in FIG. 8.
Figure 11:
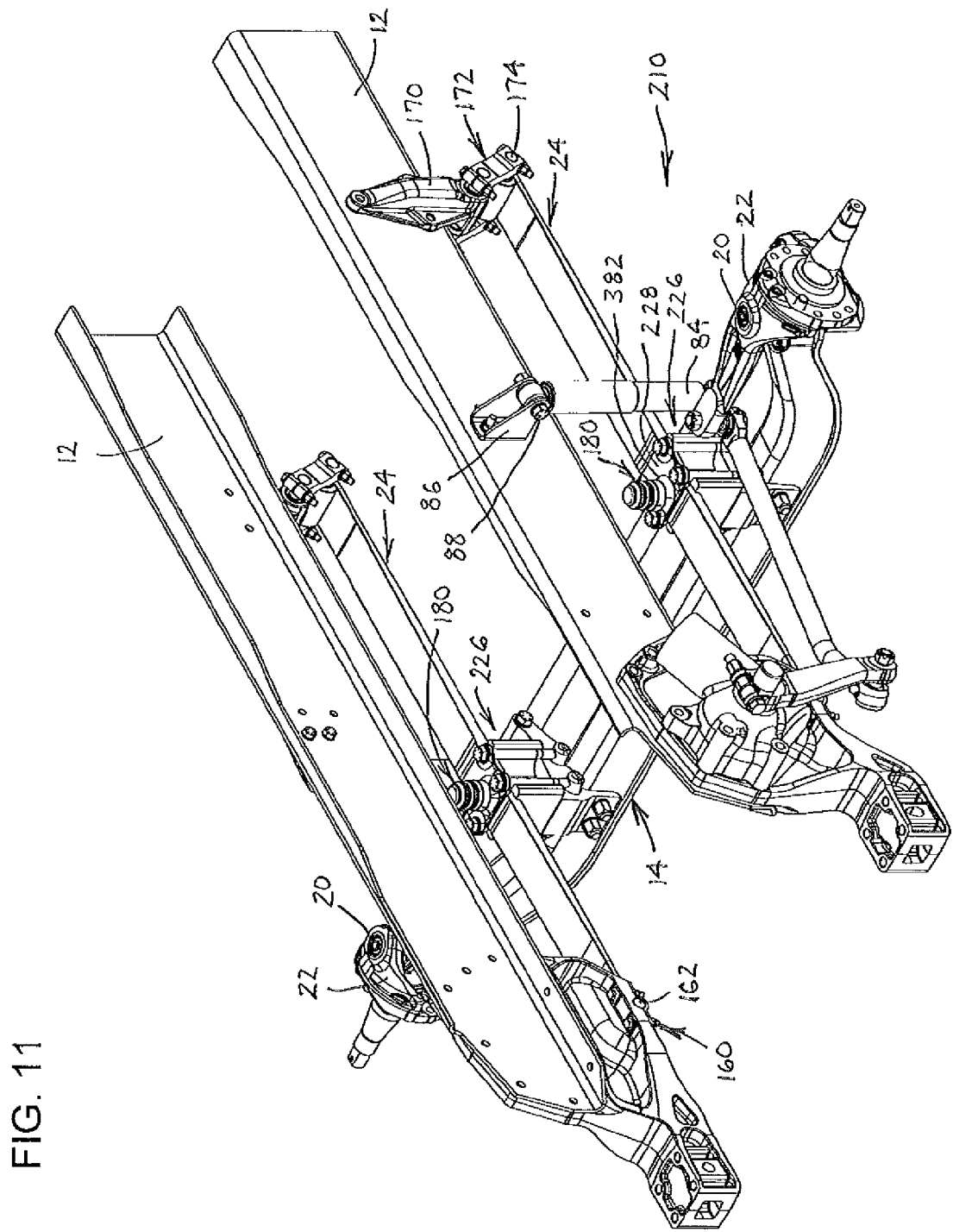
FIG. 11 is a front upper perspective view of a front suspension system of a wheeled vehicle including a second example of the inventive subject matter, which includes a bumper mounted on a leaf spring and axle coupling assembly.
Figure 12:
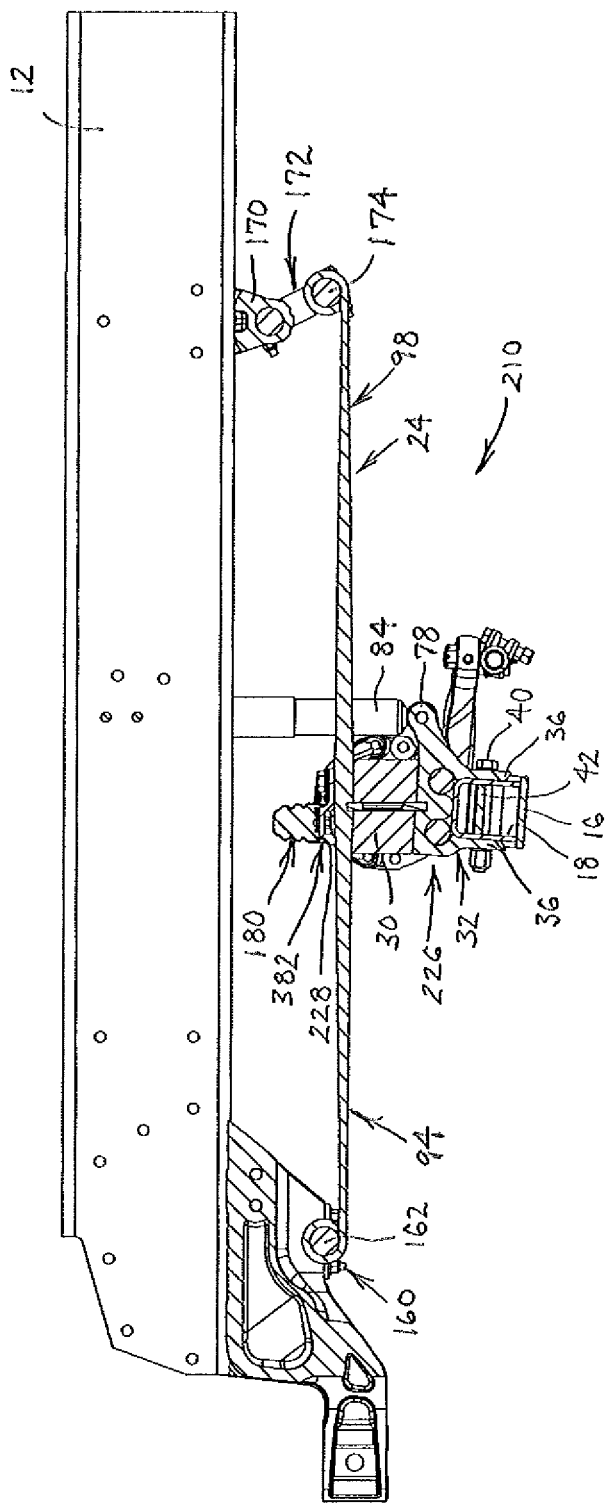
FIG. 12 is a cross-sectional side view through the right side assembly of a front suspension system incorporating the bumper, and the leaf spring and axle coupling assembly shown in FIG. 11.
Figure 13:
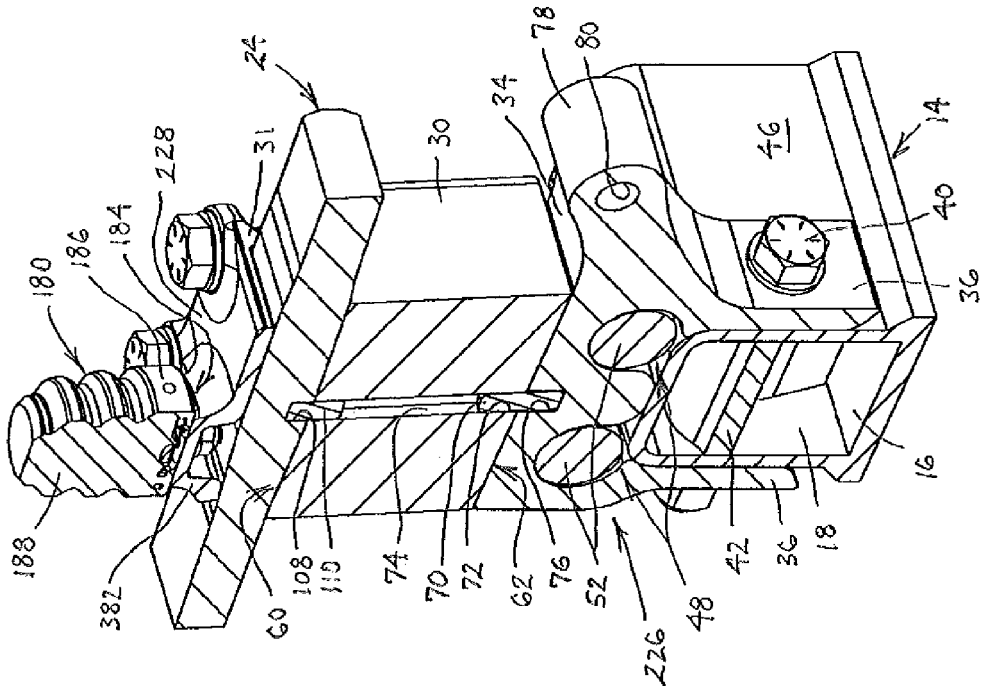
FIG. 13 is a closer upper perspective view of a portion of the leaf spring with the axle coupling assembly shown in FIG. 11.
Figure 14:
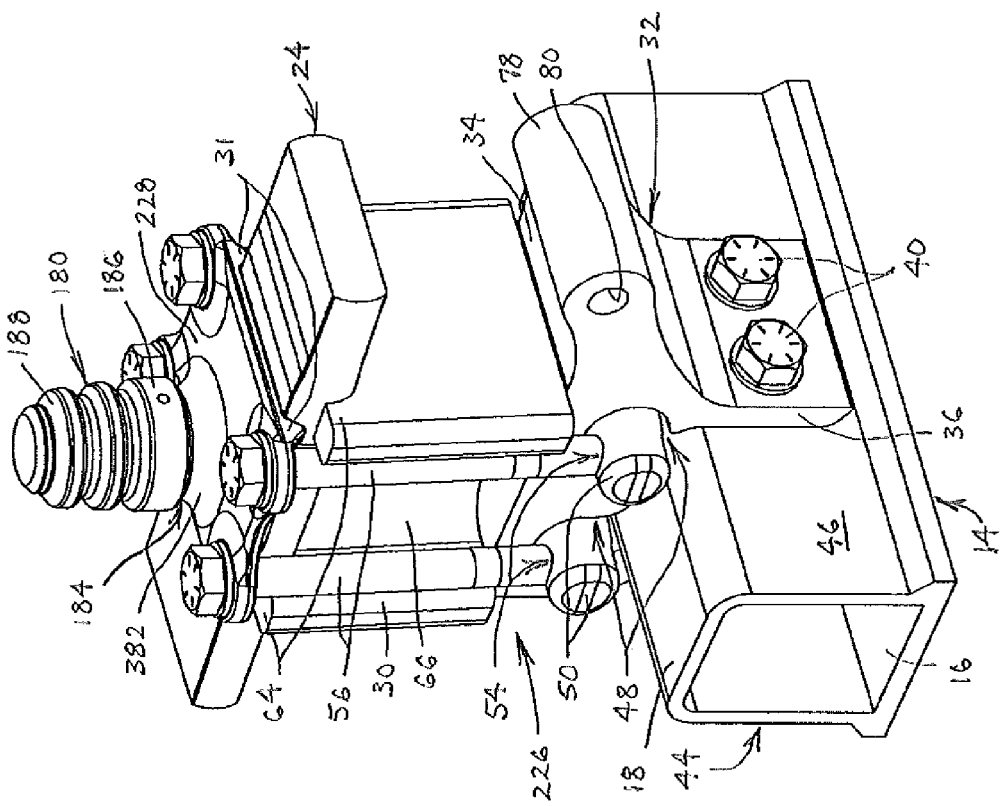
FIG. 14 is a cross-sectional perspective view through the center of the axle coupling assembly and the portion of the leaf spring shown in FIG. 13.

Tapers and their changes in thickness and width may be appreciated by comparing the respective views of the leaf spring 24, such as when viewing the leaf spring upside down in FIGS. 8 and 9, or upright in FIG. 10. For instance, within the axle seat portion 90, between the lateral lines 112 and 114 on the upper and lower surfaces 100, 102, is a portion of maximum thickness of the leaf spring 24 and within which the upper and lower surfaces 100, 102 are parallel. Extending forwardly, the axle seat portion 90 includes a taper that decreases in thickness between the lateral lines 112 and 116. Extending further forwardly and within the front limb 94, there are additional tapers with a decrease in thickness between lateral lines 116 and 118, between lateral lines 118 and 120, between lateral lines 120 and 122, and still further between lateral lines 122 and 124. In this particular example, in the generally thicker, longer and less stiff rearwardly extending portion of the leaf spring 24, the axle seat portion 90 includes a taper that decreases in thickness between the lateral lines 114 and 130. In this example, extending further rearwardly and within the rear limb 98, there are additional tapers with a decrease in thickness between lateral lines 130 and 132, between lateral lines 132 and 134, between lateral lines 134 and 136, between lateral lines 136 and 138, and between lateral lines 138 and 140. The tapers in the upper and lower surfaces 100, 102 in the axle seat portion 90 of the leaf spring 24 assist in positioning and retaining the leaf spring 24 within components of the axle coupling assembly 26 having complimentary tapered surfaces.

With respect to the tapers in width, the leaf spring 24 of this example includes a portion of minimum width within the axle seat portion 90, between the vertical lines 150 and 152 on the right and left side surfaces 104, 106. Extending forwardly, the leaf spring 24 includes a taper by which it increases in width between the vertical lines 150 and 154. Extending rearwardly, the leaf spring 24 includes a taper by which it increases in width between the vertical lines 152 and 156. The generally thinner and wider ends 92, 96 are formed into eyes, such as upturned eyes in this example, for coupling the leaf spring 24 to a frame member 12. Indeed, a first frame hanger 160 is connected to the frame member 12, such as by fasteners in the form of bolts or other suitable fastening means, and includes a bushing 162 that passes through the eye at the front end 92 of the leaf spring 24 to pivotally mount the front end 92 to the frame member 12. A second frame hanger 170 is connected to the frame member 12, such as by fasteners in the form of bolts or other suitable fastening means. The second frame hanger 170 includes a shackle 172 having a bushing 174 that passes through the eye at the rear end 96 of the leaf spring 24 to pivotally mount the rear end 96 to the frame member 12. It will be appreciated, however, that alternative configurations for leaf spring ends and frame coupling assemblies may be desired for particular mounting arrangements.

Another advantageous feature of the present disclosure is inclusion of a bumper 180 that is disposed between a leaf spring 24 and a frame member 12. In the first example suspension system 10, as may be seen in FIGS. 3 and 4, a bumper 180 is coupled to the frame member 12 by mounting to a bumper bracket 182, and is located so as to be contacted by the axle coupling assembly 26 when the suspension is compressed to at least a preselected position. The bumper 180 includes a base 184 having an annular wall 186 within which is located a resilient member 188. The resilient member 188 may be constructed of microcellular urethane or other foam that absorbs energy, or suitable plastics, rubber, metal or the like.

This construction is in contrast to hard rubber bumpers that have been used to increase load capacity and that generate jarring engagements, such as during a large jounce and rebound, or during rapid lane changes, when the vehicle experiences a rapid shift in roll and a hard bumper loses engagement and then makes an abrupt reengagement. Thus, the intention is that the bumper 180 provides relatively soft "tip in" or initial contact, at the preselected point within compression of the suspension in jounce or in roll, that the bumper 180 engages the axle coupling assembly 26, and then tends to slow the suspension travel and to increasingly bear load. The bumper 180 also provides a smoother transition when disengaging, such as during the aforementioned maneuvers. If the resilient member 188 is constructed for instance of microcellular urethane, its compression may be limited by the permitted radial expansion within the annular wall 186. Moreover, the annular wall 186 provides a fail safe positive stop, which if engaged, is intended to prevent overtravel and potential damage to the leaf spring 24.

The leaf spring 24 of the first example suspension system 10 does not incorporate the type of relative dimensions, such as the thicknesses and tapers, typically found in prior art leaf springs. Rather, as may be seen in FIGS. 8-10, the leaf spring 24 has a generally thinner axle seat portion 90, which is tapered both forwardly and rearwardly and on both its upper and lower surfaces 100, 102. It will be appreciated that in this example, the front limb 94 has a relative length and thickness that are less than the rear limb 98, while having a relatively higher vertical spring rate than the rear limb 98. Indeed, depending on the desired characteristics and the combination with and location of a bumper 180, there may be particular length and spring rate ratios between the front limb 94 and rear limb 98 that provide favorable ride characteristics, as well as effective vertical spring rate and roll stiffness performance. For instance, favorable results have been observed for a leaf spring 24 having a front limb 94 to rear limb 98 length ratio of about 46 to 54, and spring rate ratio of about 46 to 54 of the total spring rate, when used in combination with a bumper 180 that is positioned so as to contact the axle coupling assembly 26 a distance of approximately one inch forward and a distance of approximately one half inch inboard (toward the center of the vehicle) of the center of the axle coupling assembly 26. Favorable results also have been achieved with equal length limbs, and a spring rate ratio of about 40 to 60 of the total spring rate. The forward and inward location of the bumper 180 also may cause earlier engagement of the bumper 180 at a preselected point of travel within the compression of the suspension during jounce and/or roll, which can be factored into the bumper design to assist in providing relatively soft early tip in or initial engagement, helping to slow suspension travel, and to provide increased resistance with increased travel, as well as relatively soft disengagement.

Thus, the first example suspension system 10 includes a leaf spring 24 that may be generally thinner than typical single leaf constructions, resulting in softer ride characteristics than a typical single leaf spring, while providing reduced unsprung weight, and favorable overall vertical spring rate, roll stiffness and capacity to handle axle windup in extreme braking conditions. This is possible, in part, by avoiding use of a bolt through the center of the leaf spring, and including an axle coupling assembly that requires less of an inactive axle seat portion, and that interacts with tapers in the axle seat portion to assist in positioning and retaining the leaf spring within the axle coupling assembly, as well as including use of a bumper that when the suspension system encounters a condition in which the bumper is engaged and then compressed, such as in jounce or a roll condition, the vertical spring rate and roll stiffness are effectively supplemented or increased by the compression of the bumper.

It will be appreciated that while the transitions for tapers in thickness and width need not necessarily occur at the same positions along a leaf spring, in this first example leaf spring 24, as seen in FIGS. 8 and 9, there are tapers in width and thickness that occur at the same position within the axle seat portion 90, as indicated by lateral line 116 and vertical line 150. Similarly, there may be a change in the taper with respect to both thickness and width at the same position within the front limb 94, as indicated by the lateral line 124 and vertical line 154. A coincident change in taper affecting thickness and width also occurs within the axle seat portion 90 as indicated by the lateral line 114 and the vertical line 152, and may occur in the rear limb 98. However, such transitions need not be coincident.

It will be appreciated that some components, for example, fasteners for fastening together various components are not shown in the first example, so as to permit a better view of the more major components of the suspension system 10. Nevertheless, it will be recognized that various methods of fastening together components may be utilized without departing from the scope of the present disclosure, including, for example, nuts and bolts, lag screws, rivets, welding of various types, or any other suitable types of fasteners or fastening means.

Figure 15:
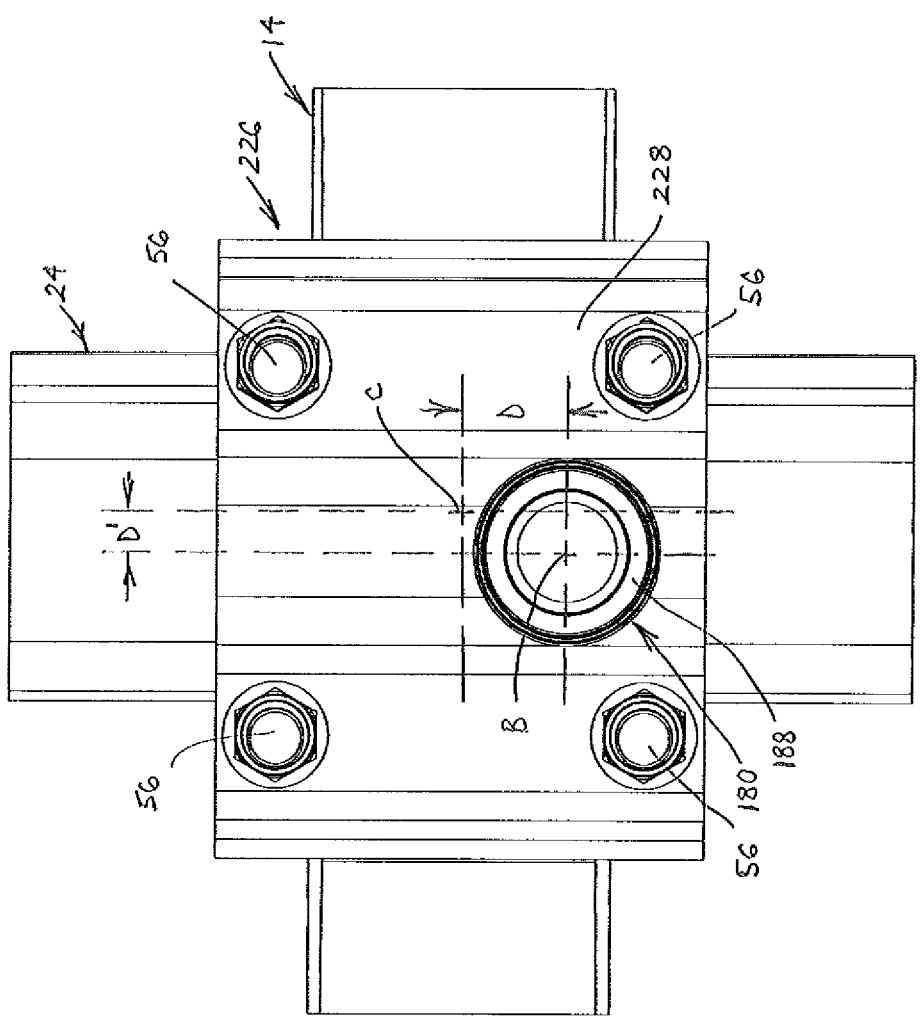
FIG. 15 is a top view of the portion of the leaf spring and axle coupling assembly shown in FIG. 13.
Figure 16:
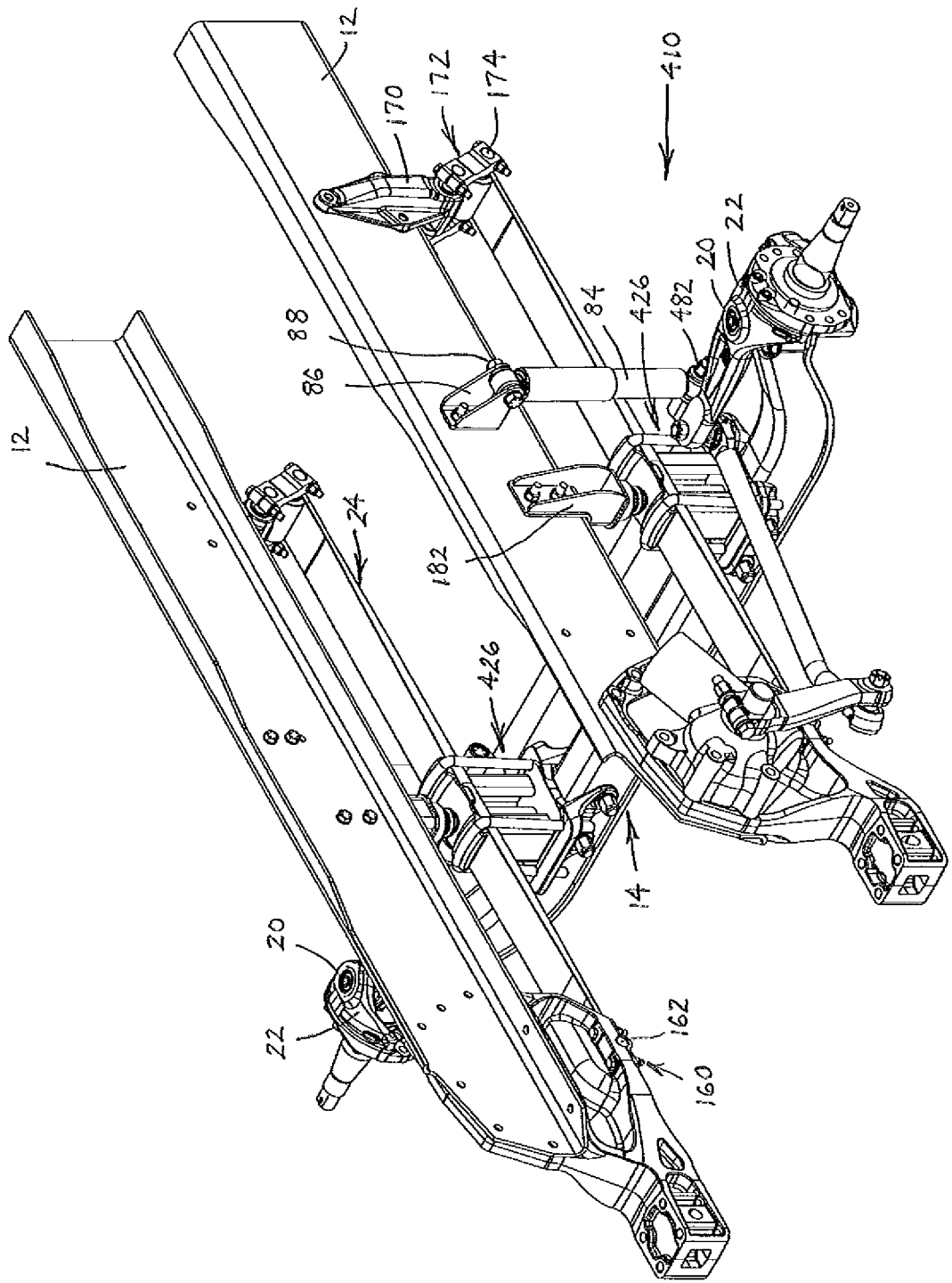
FIG. 16 is a front upper perspective view of a front suspension system of a wheeled vehicle including a third example of the inventive subject matter, which includes a bumper mounted on a vehicle frame member, above a leaf spring and axle coupling assembly.
Figure 17:
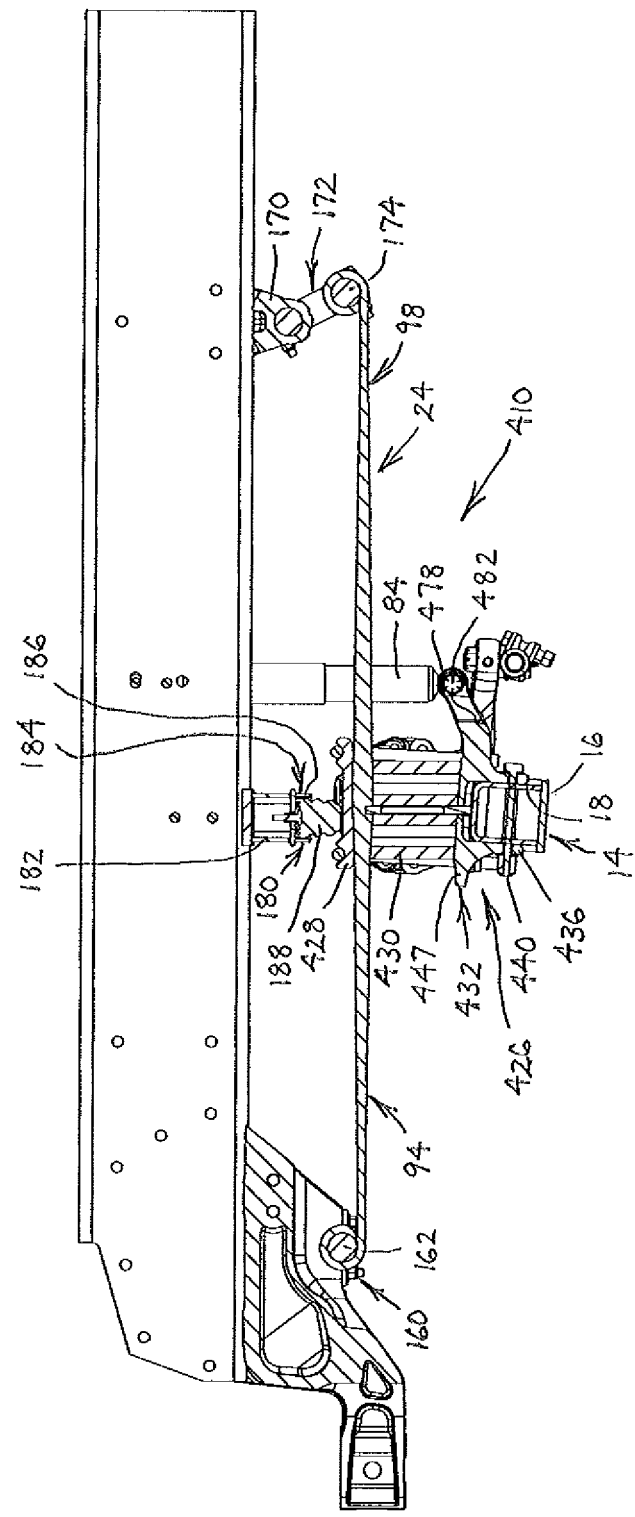
FIG. 17 is a cross-sectional side view through the right side assembly of a front suspension system incorporating the bumper, and the leaf spring and axle coupling assembly shown in FIG. 16.
Figure 18:
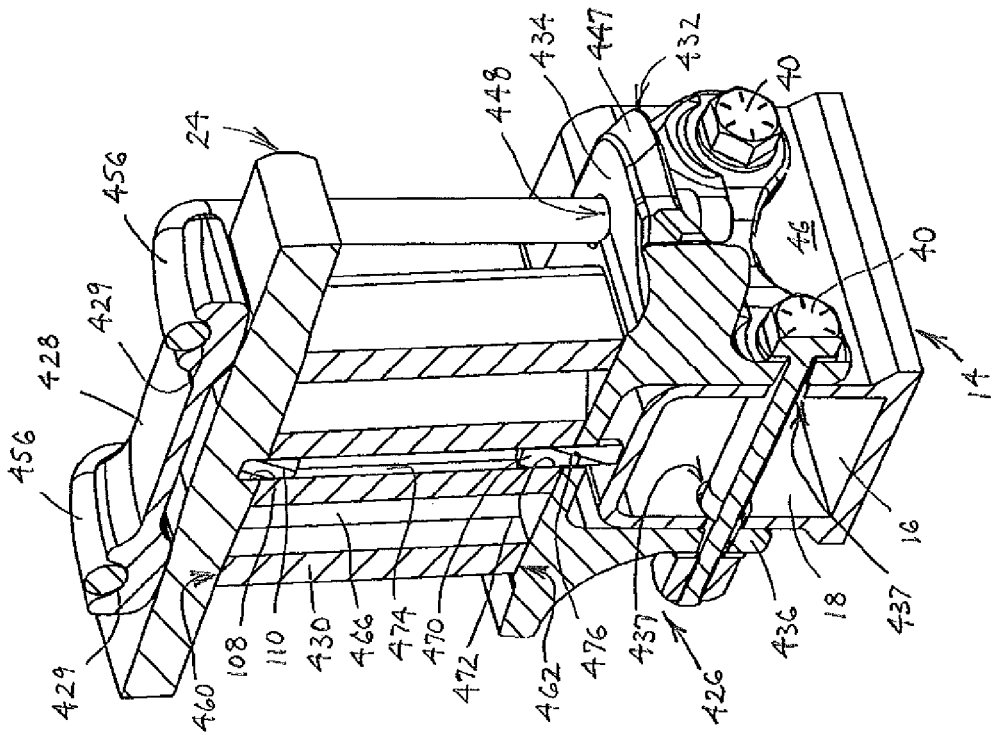
FIG. 18 is a closer upper perspective view of a portion of the leaf spring with the axle coupling assembly shown in FIG. 16.

The second example suspension system 210 is shown in FIGS. 11-15, and includes nearly all of the same components as were present in the first example, and those components will receive the same reference numerals and the description above with respect to the first example applies as to those same components. Within the second example, notable exception or deviation from the first example is that the bumper 180 may be coupled to the axle coupling assembly 226, instead of to a frame member 12. In the second example, a first mounting pad 228 of the axle coupling assembly 226 includes a mounting flange 382, and the bumper 180 is connected to the mounting flange 382. The bumper 180 is located so as to engage a lower portion of a frame rail 12 when the spring 24 is compressed at least to a preselected minimum level of compression. In addition, FIG. 15 illustrates the aforementioned positioning of the bumper 180 relative to a center C of the axle coupling assembly 226, with the center B of the bumper 180 being positioned to contact the lower surface of a frame member 12 and located a distance D of approximately one inch forward and a distance D' of approximately one half inch inboard (toward the center of the vehicle). It will be appreciated that with the inverted and alternatively mounted bumper 180, the performance of the second example suspension assembly 210 should be similar to that of the first example suspension assembly 10.

Turning now to the third example suspension system 410 which is shown in FIGS. 16-19, the suspension system 410 includes many of the same components as were present in the first example suspension assembly 10, and those components will receive the same reference numerals and the description above with respect to the first example applies as to those same components. Within the third example, notable exception or deviation from the first example is the use of an alternative axle coupling assembly 426.

From the top downward, the axle coupling assembly 426 includes a first mounting pad 428 having grooves 429, a spacer 430 and an axle seat bracket 432, or second mounting pad. A leaf spring 24 is clamped between a lower surface of the first mounting pad 428 and an upper surface of the spacer 430. The first mounting pad 428 of this example also includes locating extensions 431 that extend downward to engage the sides of the leaf spring 24, and the first mounting pad 428 preferably is constructed of forged or cast steel, while the spacer 430 preferably is constructed of extruded aluminum, such as 6061-T6, and the axle seat bracket 432 is preferably cast iron or steel. However, it will be appreciated that for each component, alternative suitable materials, configurations and methods of manufacture may be used.

The axle seat bracket 432 is fitted over the upper surface of the axle 14 and includes an upper surface 434 on which the spacer 430 rests. The axle seat bracket 432 has downwardly extending flanges 436 that engage the front and rear surfaces 44, 46 of the inverted U-shaped member 18 of axle 14. The respective downwardly extending flanges 436 include aligned bores 437 through which extend fasteners 440, such as hardened bolts that engage nuts, so as to connect the axle seat bracket 432 to the axle 14, although other suitable fastening methods and structures may be used. For enhanced support to the axle 14 when the fasteners 440 are tightened, the suspension system 410 may include sleeves and a baffle or support member, such as were provided in the first and second examples with sleeves 38 and the internal axle support member 42.

The axle seat bracket 432 includes extensions 447 having bores 448 that are generally cylindrically-shaped and sized to receive therethrough respective fasteners 456, which preferably are in the configuration of downwardly extending U-shaped bolts, each of which is received in a groove 429 of the first mounting pad 428 and receives a nut at its lower end. When tightened, the fasteners 456 clamp together the first mounting pad 428, the leaf spring 24, the spacer 430 and the axle seat bracket 432, ultimately coupling the axle 14 to the leaf spring 24. Alternative ways of fastening the components to each other may be used, such as if the first mounting pad 428 included extensions having bores and the fasteners 456 were instead individual bolts and nuts that would extend through the first mounting pad 428 and the axle seat bracket 432, or other suitable axle coupling assembly configurations.

As noted previously it is common to include a fixed caster or pinion angle, and this may be achieved within the axle coupling assembly 426 by including it within the configuration of the spacer 430. Thus, the spacer 430 includes an upper surface 460 that engages the leaf spring 24 where the upper surface 460 is angled relative to the lower surface 462 of the spacer 430. A fixed caster angle could otherwise be provided by including an additional wedge component, or could be built into the axle seat bracket 432. However, a common axle seat bracket 432 may be used for several different assemblies if the caster or pinion angle is provided in a spacer or wedge component. To reduce the weight of the spacer 430, the sides 466 of the spacer 430 also may be sculpted to include recesses. It also will be appreciated that, the spacer 430 may be extruded, as noted above, and then may be machined to introduce a caster angle.

Figure 19:
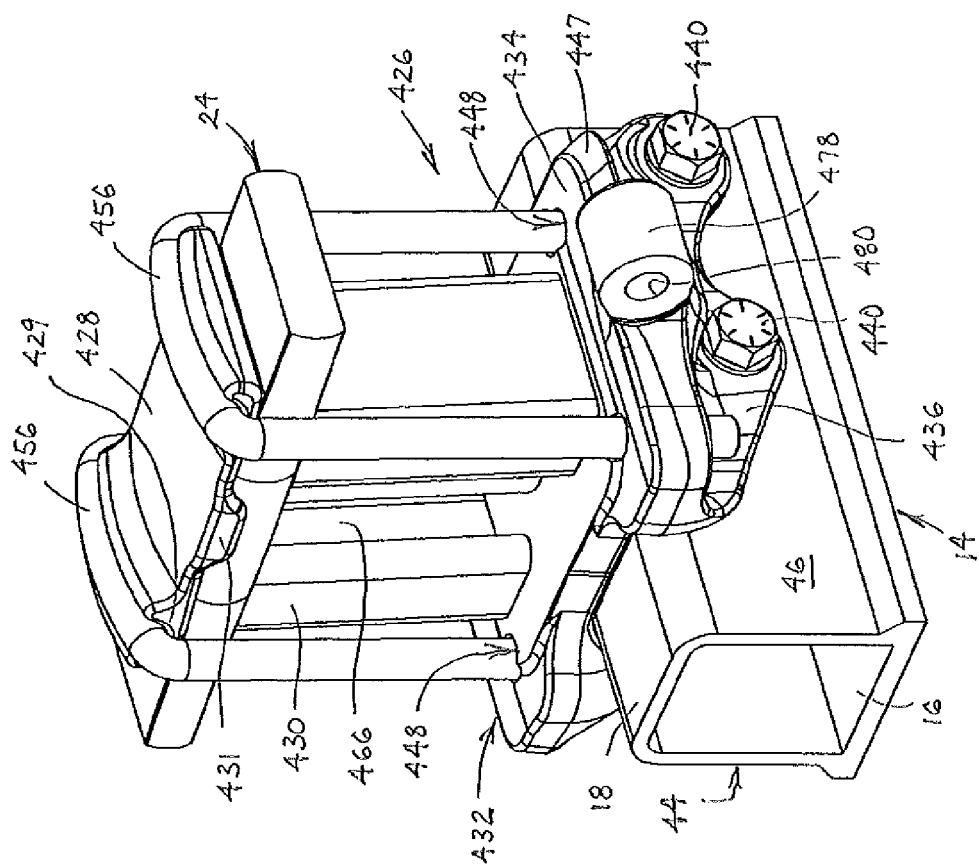
FIG. 19 is a cross-sectional perspective view through the center of the axle coupling assembly and the portion of the leaf spring shown in FIG. 18.

In addition, a further locating feature is provided by engagement of a fastener 470, shown for example in FIG. 19 in the form of a pin or stud, with a locator 472 in the spacer 430, in the form of a central passage 474. A corresponding locator 476 is configured as a bore through the center of the upper surface 434 of the axle seat bracket 432. Also, as in the first example suspension system 10, the leaf spring 24 of the third example suspension system 410 includes a locator 108, in the form of a receptacle in the lower surface 102, which in this example is formed by hot staking or embedding a fastener 110, shown in the form of a pin or stud, into the lower surface 102 of the leaf spring 24. When assembled, the fastener 110 is received within the central passage 474 within the spacer 430. The locator 108 that receives the fastener 110 and the respective passage 474 serve to position and hold the leaf spring 24 longitudinally within the axle coupling assembly 426. It will be appreciated that alternative locating structures could be utilized, and use of a fastener and locator could be reversed relative to the particular components, but if possible, it is preferred to not use a bolt through a hole in the center of the leaf spring 24.

The axle seat bracket 432 also may include further mounting extensions or bores for connection to other components. For instance, to provide suspension system damping, the axle seat bracket 432 may include an extension 478 having a bore 480 therethrough to receive a fastener 482, such as a bolt, for connection to the lower end of a shock absorber 84. Shock absorber 84 may be connected at its upper end to a mounting bracket 86 that receives a fastener 88, such as a bolt.

While the above referenced axle coupling assemblies 26, 226, 426 are illustrated, the scope of this disclosure is not to be limited to such examples, as other configurations and components may be utilized. Indeed, more common axle coupling assemblies may be utilized if adjustments are made, such as by machining or by inclusion of special inserts, to accommodate a leaf spring having tapers on the upper and lower surfaces in the axle seat portion, and to accommodate use of a bumper in accordance with this disclosure.

In light of the above discussion, the drawings and the attached claims, it will be appreciated that suspension systems, leaf springs and methods of controlling jounce and roll stiffness in a suspension system of a vehicle in accordance with the present disclosure may be provided in various configurations. Any variety of suitable materials of construction, configurations, shapes and sizes for the components and methods of connecting the components may be utilized to meet the particular needs and requirements of an end user. It will be apparent to those skilled in the art that various modifications can be made in the design and construction of such suspension systems and leaf springs, and in the performance of such methods, without departing from the scope of the attached claims, and that the claims are not limited to the preferred embodiments illustrated.

We claim:

1. A suspension system for a vehicle axle comprising:
   a leaf spring configured to be coupled at a front end and a rear end to a frame member of the vehicle;
   an axle coupling assembly configured to be coupled to the leaf spring and to an axle of the vehicle;
   a bumper coupled to the axle coupling assembly or to the frame member of the vehicle and disposed to have a center of the bumper forward and inboard of a center of the axle coupling assembly and to be engaged when the leaf spring is compressed to at least a preselected position;
   the leaf spring including tapered upper and lower surfaces in an axle seat portion; and
   the leaf spring including a front limb having a vertical spring rate and a length that extends forward from the axle seat portion to the front end and a rear limb having a vertical spring rate and a length that extends rearward from the axle seat portion to the rear end.

2. The suspension system of claim 1 wherein the axle coupling assembly includes tapered surfaces that engage the tapered upper and lower surfaces of the leaf spring in the axle seat portion thereby assisting in longitudinal retention of the leaf spring within the axle coupling assembly.

3. The suspension system of claim 1 wherein the leaf spring further comprises a fastener extending from the lower surface of the leaf spring in the axle seat portion.

4. The suspension system of claim 1 wherein when the bumper is engaged during jounce, roll or braking, the bumper assists in balancing stress in the front and rear limbs of the leaf spring.

5. The suspension system of claim 1 wherein when the bumper is engaged the roll stiffness of the suspension system is increased.

6. The suspension system of claim 1 wherein engagement and compression of the bumper provides increased vertical spring rate in the suspension system.

7. The suspension system of claim 1 wherein locating the bumper forward of the center of the axle coupling assembly allows the rear limb of the leaf spring to effectively add roll spring rate.

8. The suspension system of claim 1 wherein the leaf spring front limb length is less than the rear limb length.

9. The suspension system of claim 1 wherein the leaf spring front limb vertical spring rate is greater than the rear limb vertical spring rate.

10. The suspension system of claim 1 wherein the leaf spring has a maximum thickness that is located within the axle seat portion.

11. The suspension system of claim 1 wherein the front end of the leaf spring further comprises an eye and the rear end further comprises an eye.

12. The suspension system of claim 1 wherein the axle coupling assembly includes an axle seat bracket and a first mounting pad that is operatively coupled to the axle seat bracket.

13. A method of controlling roll stiffness in a suspension system for a vehicle comprising:
    providing a leaf spring having an axle seat portion having tapered upper and lower surfaces, a front limb having a vertical spring rate and a length that extends forward from the axle seat portion to a front end and a rear limb having a vertical spring rate and a length that extends rearward from the axle seat portion to a rear end;
    providing couplings that connect the front and rear ends of the leaf spring to a vehicle frame member;
    providing an axle coupling assembly that couples a vehicle axle to the axle seat portion of the leaf spring;
    providing a bumper disposed between the leaf spring and the vehicle frame member;
    wherein a center of the bumper is located forward and inward of a center of the axle coupling assembly and wherein when the suspension system is in a roll condition and the bumper is engaged and compressed, roll stiffness of the leaf spring is increased.

14. The method of controlling roll stiffness in a suspension system for a vehicle of claim 13 further comprising providing a fastener that engages the leaf spring in the axle seat portion and engages the axle coupling assembly.

15. The method of controlling roll stiffness in a suspension system for a vehicle of claim 13 wherein the leaf spring has a front limb length that is less than the rear limb length.

16. The method of controlling roll stiffness in a suspension system for a vehicle of claim 13 wherein the leaf spring has a front limb vertical spring rate that is greater than the rear limb vertical spring rate.

* * * * *